United States Patent [19]

Linscott, Jr.

[11] 4,032,057
[45] June 28, 1977

[54] BRAZING CLIP
[75] Inventor: Phillip S. Linscott, Jr., Rockford, Ill.
[73] Assignee: Sundstrand Corporation, Rockford, Ill.
[22] Filed: Mar. 18, 1976
[21] Appl. No.: 667,931
[52] U.S. Cl. .................................. 228/56; 228/212; 228/255
[51] Int. Cl.² .................... B23K 1/04; B23K 35/14
[58] Field of Search ............ 228/56, 212, 251, 253, 228/255; 219/86, 94

[56] References Cited
UNITED STATES PATENTS 1,783,802  12/1930  Lagerblade ..................... 228/255 X
1,823,028  9/1931   Caldwell ........................ 228/255 X
2,664,844  1/1954   Siegrist et al. ...................... 228/56

Primary Examiner—James L. Jones, Jr.
Assistant Examiner—K. J. Ramsey
Attorney, Agent, or Firm—Ted E. Killingsworth; Michael B. McMurry; William R. Peoples

[57] ABSTRACT

In order to secure a copper spacer element between two wires while brazing the wires to the spacer, a brazing clip is provided with retaining members to aid in maintaining the brazing clip and the copper spacer between the wires during the brazing operation. Retention of the copper spacer element between the two wires is additionally facilitated by configuring the clip to retain the spacer element by means of spring forces.

11 Claims, 3 Drawing Figures

BRAZING CLIP

BACKGROUND OF THE INVENTION

The invention relates generally to the field of brazing, and more specifically, to a means for retaining various elements to be brazed together during a brazing operation.

There are a number of instances when it is desirable to braze together an assembly consisting of two copper wires of rectangular cross section with a small copper spacer of rectangular cross section inserted between the wires. For example, such a braze is particularly useful in manufacturing aircraft generators, since by brazing a small copper spacer between two rectangular cross-sectional copper wires, a stator end-turn can be readily formed. In addition it is advantageous to automate the brazing process insofar as possible.

By inserting a U-shaped clip of brazing material between the copper spacer and the wires, it is possible to simultaneously braze both wires to the copper spacer utilizing an automatic brazing machine. However, the compressive force of brazing machine contacts pressing on the wires, along with the electrical current required for brazing, often cause the U-shaped brazing clip and the spacer element to slip out of position, resulting in an unacceptable braze joint.

SUMMARY OF THE INVENTION

It is therefore an object of the invention to provide a brazing clip configured with retaining means effective to maintain the position of the brazing clip in relation to two wires and a spacing element during a brazing operation.

It is an additional object of the invention to provide a brazing clip, for insertion between two wires and a spacer element, configured with: two legs, each of which is inserted between one wire and the spacer element; retaining portions which are positioned against one side of each of the wires; and a connecting crosspiece portion which is positioned against at least one of the other sides of the wire and one side of the spacer member, effective to retain the brazing clip and the spacer element in a predetermined relationship with the wires during a brazing operation. The dimensions of the brazing clip can also be selected to retain the desired relationships by spring tension.

DETAILED DESCRIPTION OF THE INVENTION

Figure 1:
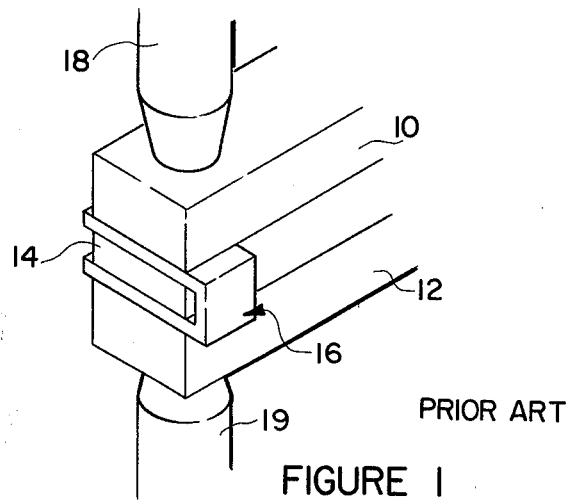
FIG. 1 is an illustration of a U-shaped brazing clip positioned between two wires and a spacer element according to conventional prior art practice.

In FIG. 1 is illustrated a typical prior art arrangement for brazing two wires 10 and 12 of rectangular cross section together to form an end-turn for a generator stator winding. Positioned between the wires 10 and 12 is a copper spacer element 14 of rectanglar cross section which in turn is separated from the wires 10 and 12 by a U-shaped brazing clip 16 of a material suitable for facilitating the brazing operation. Pressure and an electric current are applied to the wires 10 and 12, the spacer element 14 and the brazing clip by means of an automatic brazing machine having a pair of terminals 18 and 19. The automatic brazing machine automatically regulates the amount of physical pressure applied to the wires 10 and 12 along with the amount and duration of current transmitted through the wires 10 and 12. Such automatic brazing machines are in common use throughout industry.

However, it has been discovered through practical application of the brazing technique illustrated in FIG. 1 that the application of pressure and current sufficient to braze the copper spacer element 14 to the wires 10 and 12 often results in the spacer element 14 and the brazing clip 6 sliding out of the desired position, resulting in an unacceptable braze joint.

Figure 2:
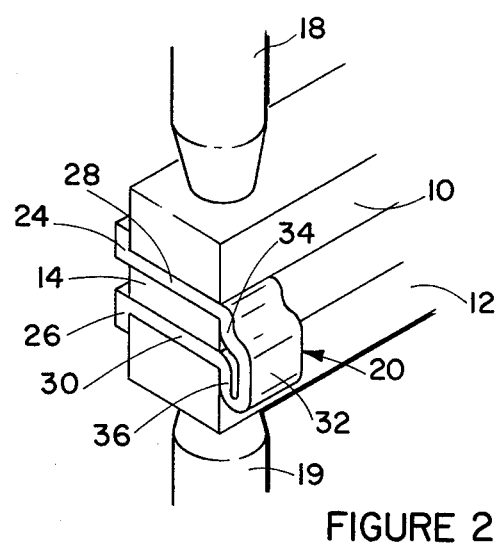
FIG. 2 is a first embodiment of a brazing clip according to the present invention having portions positioned between two wires and a spacer element.

In order to avoid the problem of the slippage of the copper spacing element 14 and the brazing clip 16, a brazing clip indicated generally at 20 in FIG. 2 was developed. The brazing clip 20 is configured with two retaining portions 24 and 26 which in the assembly of FIG. 2 are positioned along one side of the wires 10 and 12. The retaining portions 24 and 26 are attached to legs 28 and 30 which are interposed between the wires 10 and 12 and the spacer element 14. In addition, the brazing clip 20 can also be considered to have a portion or a connecting cross-piece 32 which in turn has a central portion 34 positioned against one side of the spacer element 14 and end portion 36 positioned against the other side of wire 12. In the configuration as shown in FIG. 2 the brazing clip 20 effectively serves to retain the copper spacing element in the desired relationship between the wires 10 and 12 during the brazing operation.

In order to further enhance the retentive characteristics of the brazing clip 20, the length of the lower leg 30 can be made somewhat shorter than the width of the lower wire 12 so that the clip 20 is retained on the lower wire 12 by means of a spring force acting on the retaining portion 26 and the connecting portion 36. In addition, it may be also desirable to configure the brazing clip 20 such that the spacer element 14 is retained between the legs 28 and 30 by means of a spring force. This can be accomplished by initially dimensioning the connecting portion 32 such that the normal distance between the members 28 and 30 is less than the height of the spacer element 14.

Figure 3:
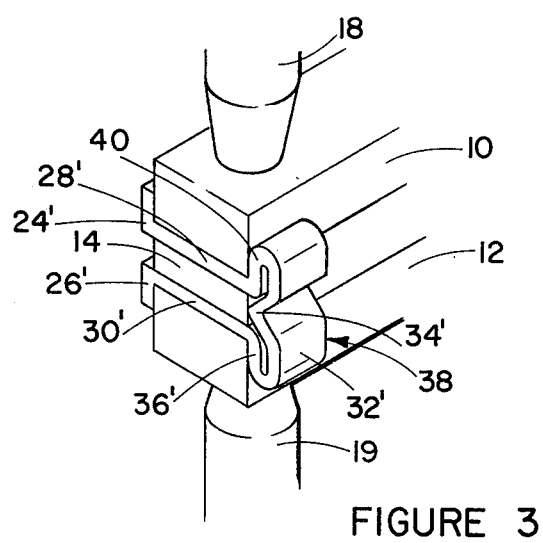
FIG. 3 is a second embodiment of a brazing clip according to the present invention having portions positioned between two wires and a spacer element.

A second embodiment of the invention is illustrated in FIG. 3. Here, the brazing clip, indicated generally at 38, has an additional end portion 40 of the connecting member 32' in contact with one side of the upper wire 10. This is in addition to the portion 36' of the connecting member 32' which is positioned against the corresponding side of the lower wire 12. Also, in brazing clip 38 of FIG. 3 an additional portion 34' of the connecting member 32' is positioned against the copper spacer element 14 at approximately the mid-point of one side of the spacer element 14. Here again, the retaining portions 24' and 26' cooperate with the portions 40 and 36' of the connecting member 32 to retain the brazing clip 38 and the spacer element 14 in the desired position with respect to the wires 10 and 12.

As with the brazing clip 20 of FIG. 2, the retaining portions 28' and 30' can be spaced relative to the portions 40 and 36' so as to maintain the clip 38 on the wires 10 and 12 by means of a spring force. The connecting member can also be initially dimensioned so as to retain the spacing element 14 between the members 28' and 30' by spring tension.

It should be understood that the brazing clip is preferably formed out of a single piece of brazing material. As for the material of the brazing clip, the American Welding Society's AWS-BCUP-5 is one example of a material suitable for forming the brazing clip which will form a satisfactory braze in combination with the copper wires and the copper spacer.

I claim:

1. A brazing clip for use in brazing two wires and a spacer element together wherein the brazing clip is maintained in a predetermined position between the wires and with respect to the spacer element during the brazing operation, wherein the brazing clip comprises:
   a first leg suitable for inserting between a first wire and the spacer element;
   a second leg suitable for insertion between a second wire and the spacer element;
   a first retaining portion secured to one end of said first leg and configured to abut a first side of said first wire;
   a second retaining portion secured to one end of said second leg and configured to abut a first side of said second wire; and
   a connecting crosspiece secured to the other end of said first leg and the other end of said second leg wherein said crosspiece is configured with an end portion abuttable with a second side of said second wire effective to retain the brazing clip in the predetermined position during a brazing operation.

2. The brazing clip of claim 1 wherein said crosspiece is additionally configured with a central portion abuttable with one side of the spacer element effective to retain the spacer element in the predetermined position during a brazing operation.

3. The brazing clip of claim 2 wherein said crosspiece is initially dimensioned to effectively retain the spacer element between said first and said second legs by means of a spring force.

4. The brazing clip of claim 2 wherein said second leg is initially dimensioned to retain said clip on said second wire by means of a spring force which effectively clamps said second wire between said second retaining portion and said end portion of said crosspiece.

5. The brazing clip of claim 4 wherein said crosspiece is initially dimensioned to effectively retain the spacer element between said first and said second legs by means of a spring force.

6. The brazing clip of claim 1 wherein said crosspiece is configured with a first end portion abuttable with a second side of said first wire and a second end portion abuttable with a second side of said second wire effective to retain the brazing clip in the predetermined position during a brazing operation.

7. The brazing clip of claim 6 wherein said crosspiece is additionally configured with a central portion abuttable with one side of the spacer element effective to retain the spacer element in the predetermined position during a brazing operation.

8. The brazing clip of claim 7 wherein said crosspiece is initially dimensioned to retain the spacer element between said first and said second legs by means of a spring force.

9. The brazing clip of claim 7 wherein said crosspiece and said first and second legs are initially dimensioned to effectively retain the clip on each of said wires by means of a spring force resulting from the cooperation of each of said retaining portions with the corresponding first and second end portions of said crosspiece.

10. The brazing clip of claim 9 wherein said clip is initially dimensioned to retain the spacer element between said first and said second legs by means of a force resulting from a spring action of said crosspiece.

11. A brazing clip for use in holding two wires of rectangular cross section and an intervening spacer element of rectangular cross section together during a brazing operation with portions of the brazing clip located between the spacer and each wire, comprising:
   a generally U-shaped member having spaced generally parallel legs connected at one end thereof by a crosspiece and unconnected at the opposite end thereof,
   said member being positionable to embrace the spacer, with the legs between the spacer and each wire, and with the crosspiece at one side of the spacer,
   the crosspiece having a central portion engageable with the spacer at said one side thereof,
   the crosspiece having on at least one end thereof a portion engageable with one wire at said one side thereof,
   at least one leg having at the free end thereof, an angularly directed retaining portion engageable with said one wire at the opposite side thereof from said crosspiece end portion in opposition thereto.

* * * * *